Figures 1, 10:
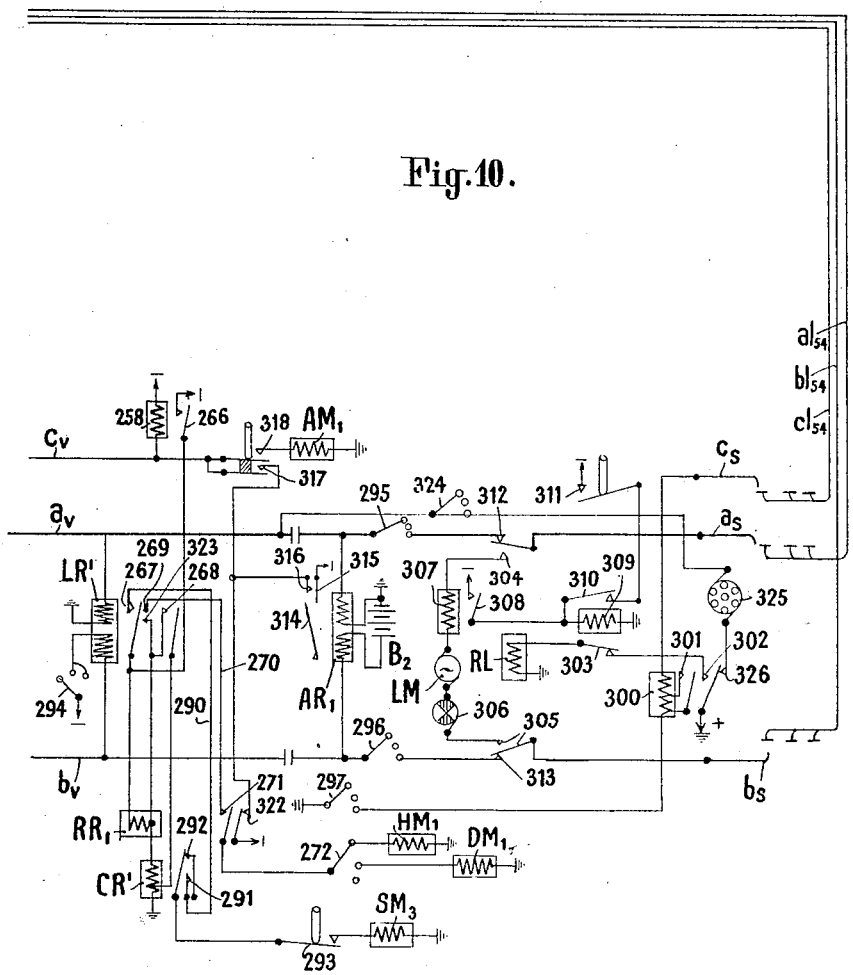

F. ALDENDORFF.
SWITCHING APPARATUS.
APPLICATION FILED MAR. 16, 1914. RENEWED FEB. 3, 1920.

1,348,835.

Patented Aug. 3, 1920.

Witnesses:

Inventor:
Fritz Aldendorff

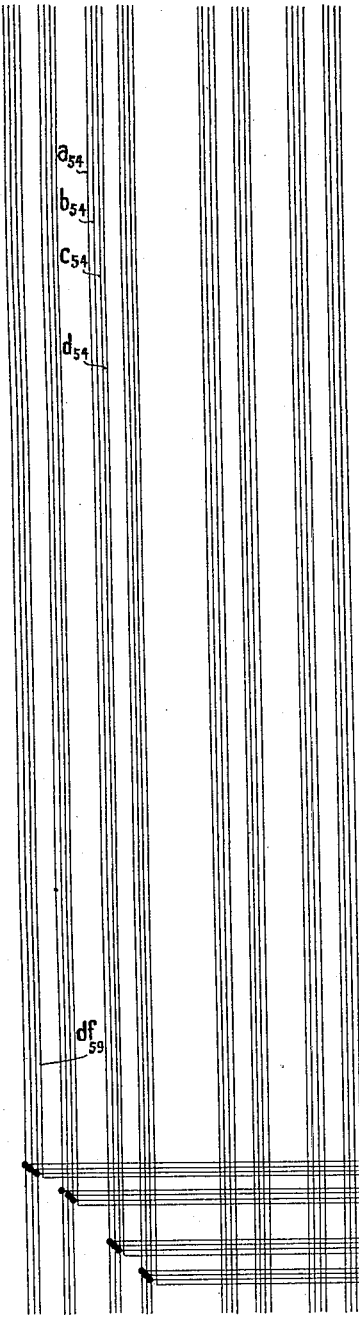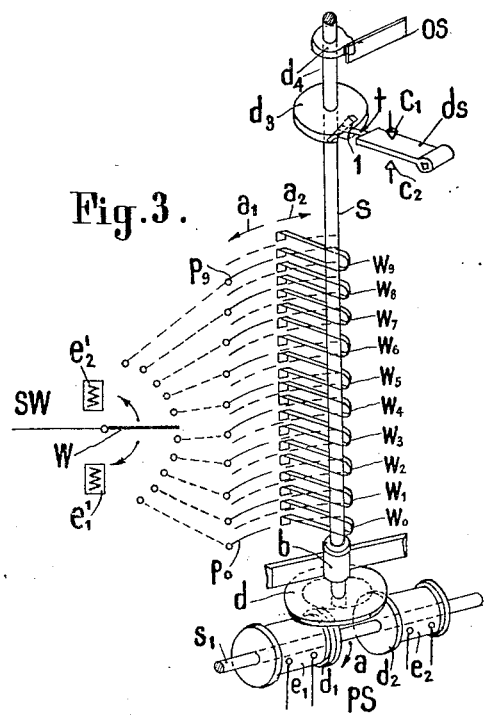

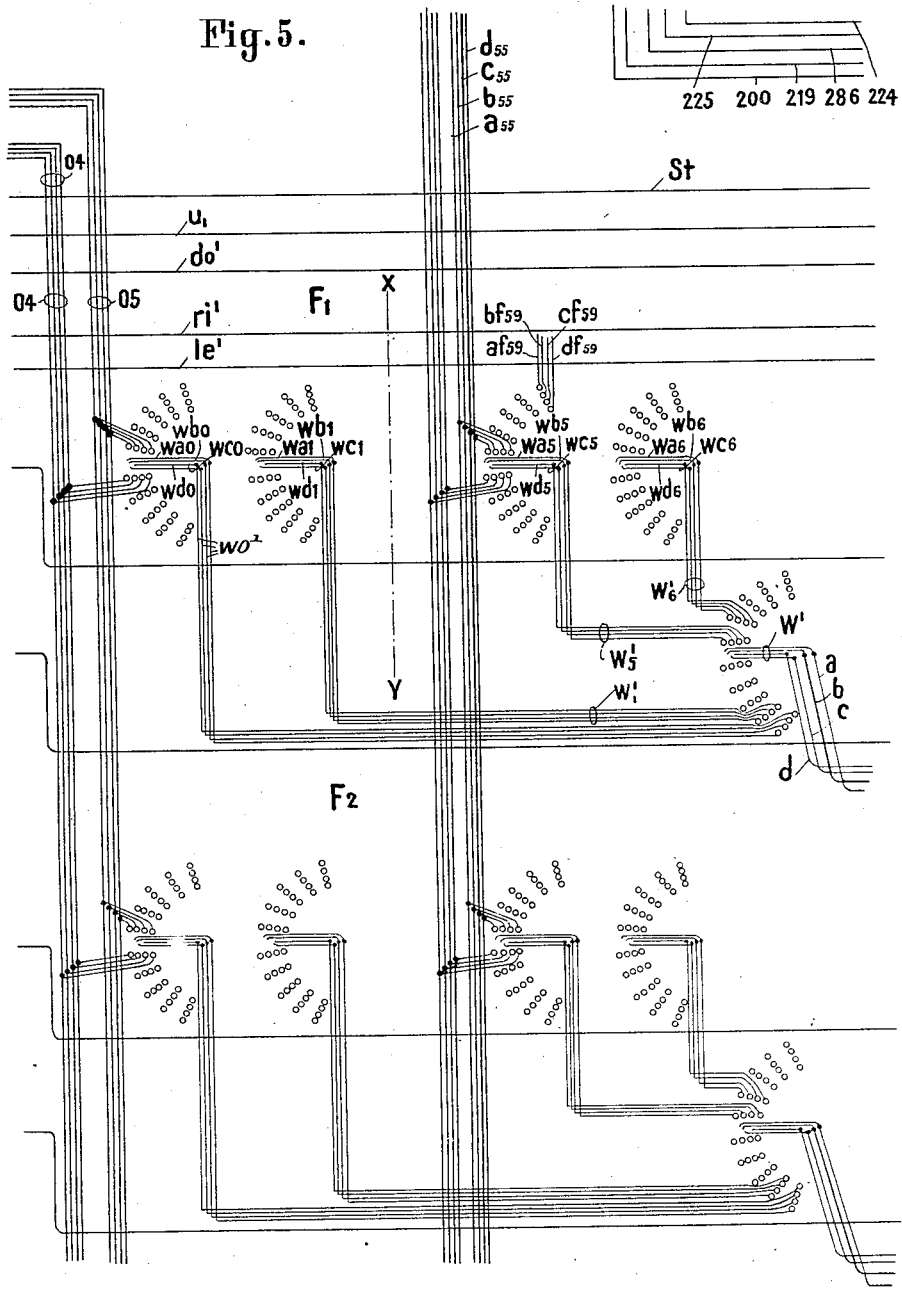

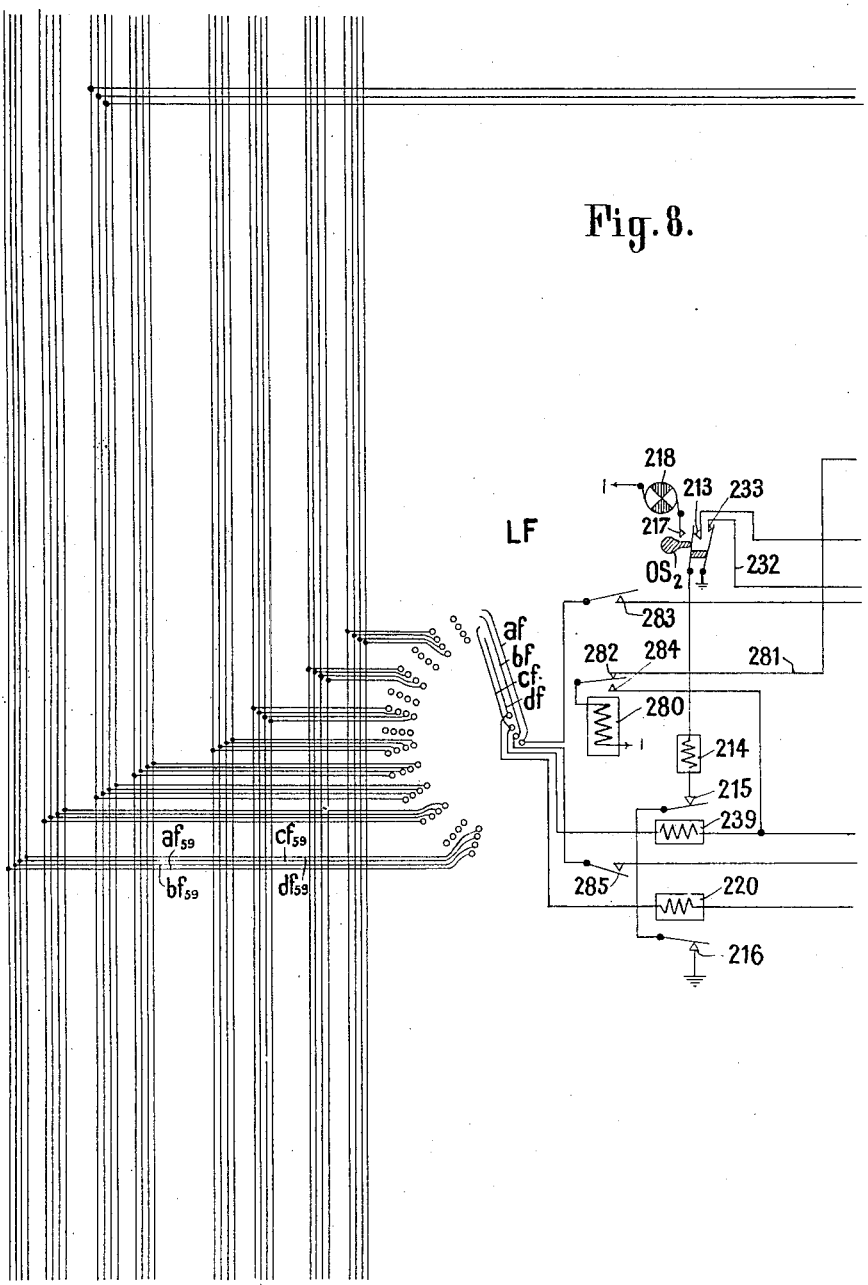

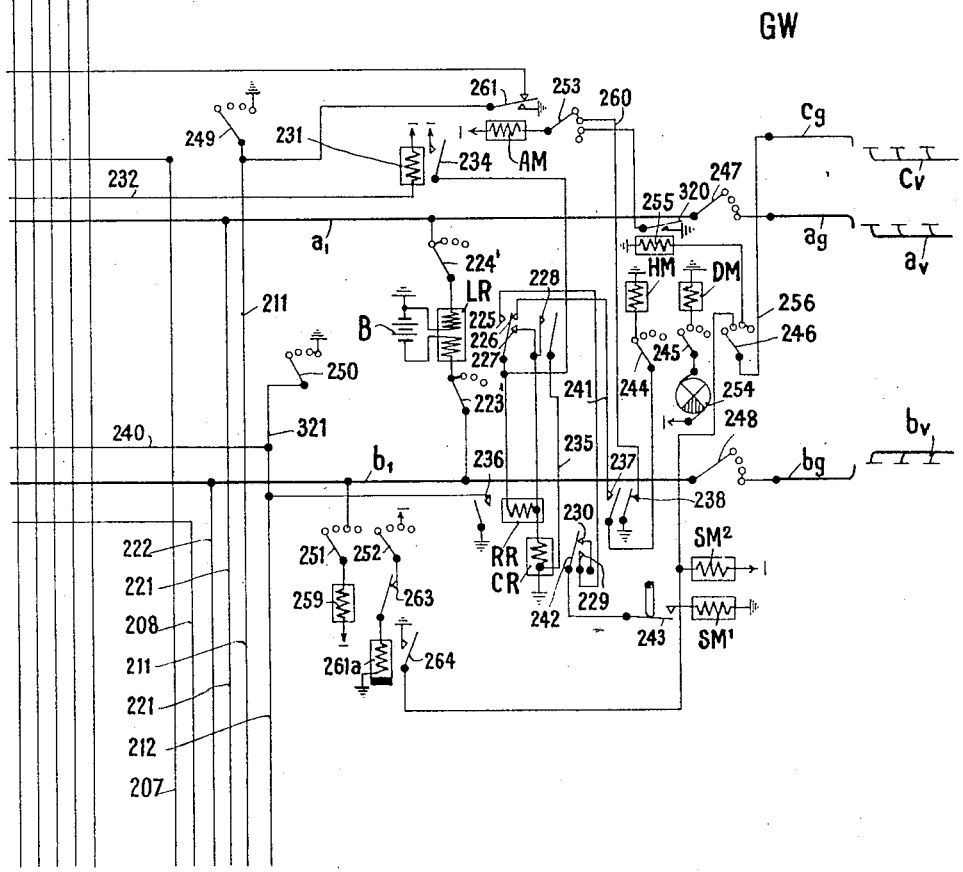

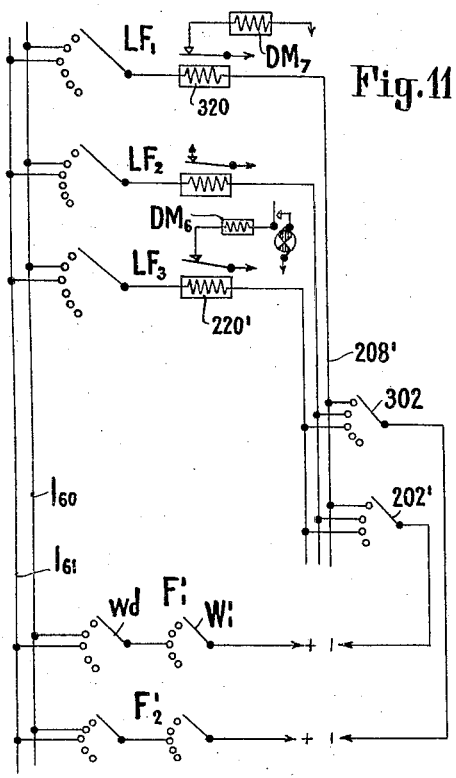
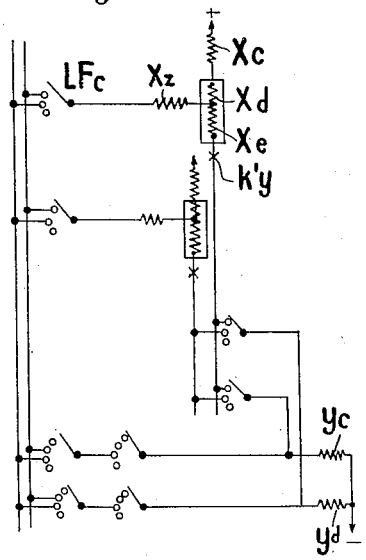
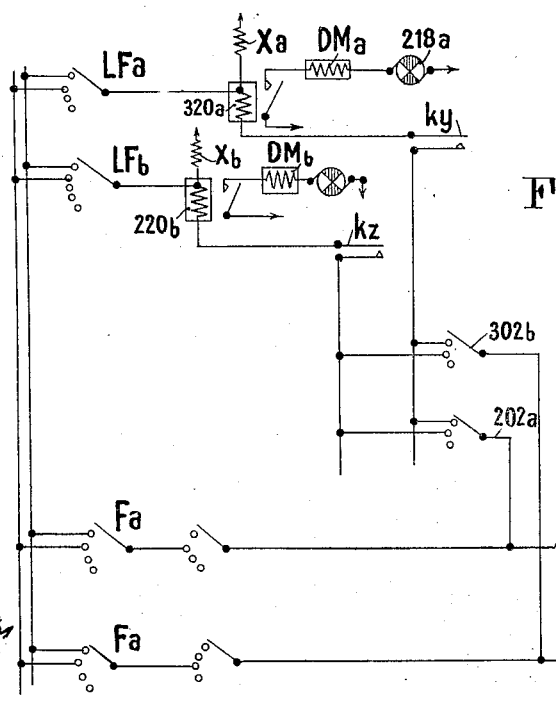

UNITED STATES PATENT OFFICE.

FRITZ ALDENDORFF, OF WILMERSDORF, BERLIN, GERMANY.

SWITCHING APPARATUS.

1,348,835.     Specification of Letters Patent.     Patented Aug. 3, 1920.

Application filed March 16, 1914, Serial No. 825,102. Renewed February 3, 1920. Serial No. 356,000½.

*To all whom it may concern:*

Be it known that I, FRITZ ALDENDORFF, a subject of the King of Great Britain, residing at 32 Mannheimerstrasse, Wilmersdorf, Berlin, Germany, have invented certain new and useful Improvements in Switching Apparatus, of which the following is a specification.

My invention relates to improvements in systems for interconnecting telephone lines by electro-mechanically controlled switches.

The object of the invention is to provide an improved percentage system in which quick-acting line finders connect calling subscribers to idle selectors so quickly as to insure all selecting impulses which calling subscribers intend to deliver to the selectors being received by the selectors, instead of failing to reach them on account of the calling subscribers commencing to work their impulse transmitters before the line finders have found time to connect them to an idle selector.

Quick-acting finders are expensive and their number should be reduced to the utmost limit. In order to attain this object a group of comparatively slow-acting finders and another group of quick-acting finders is provided for each group of subscribers. When a subscriber makes a call he is rapidly connected to an idle selector by a quick-acting finder so that the subscriber can immediately commence sending impulses. This connection through the quick-acting finder is maintained until the connection with the desired line is established or until the connection has progressed to a certain stage when it is substituted by a connection through a comparatively slow-acting finder that maintains the connection until the end of the conversation. The quick-acting finder which was only used for a few seconds is immediately made available for new connections. With this arrangement two or three quick-acting finders will be sufficient for a group of two or three hundred subscribers. The number of slow-acting finders will be equal to the greatest number of simultaneous conversations in the busiest hour. Associated with each quick-acting line finder is a selector finder which always keeps its quick-acting finder connected to an idle selector. The selector finders keep traveling over contacts connected to selectors until a contact or set of contacts corresponding to a trunk leading to an idle selector is reached. It stops at this trunk rendering it engaged and keeping it ready for the next connection that is to be made through its quick-acting finder. When this connection has progressed through the exchange switches to a certain stage (*e. g.* up the point where the first or second selector has been started hunting for an idle trunk leading to a certain group) the selector finder receives a starting current that starts it hunting for another trunk leading to another selector. There are fewer selector finders than selectors and there will never be more than one selector finder connected to any trunk.

The first group selectors associated with the slow-acting finders are so arranged that when a talking connection is extended through one of them and through a second selector or final selector certain functions will occur simultaneously in the first group selector and the second group selector or in the first group selector and the final selector. For example, in the moment when the action of the final selector changes from selecting a certain row of contacts to selecting a certain set of contacts in a row a starting circuit is closed in the group selector which causes the selector finder that is connected at the time to the group selector to start moving so as to sever its connection with the group selector and to hunt for an idle group selector to which it may connect the quick-acting finder that is associated with it. The moment the connection between a group selector and a quick-acting finder is severed in the manner just described a new connection is made between the calling line and the group selector through a comparatively slow-acting finder, the slow-acting finder having prepared this other connection during the time the calling subscriber or the semi-automatic operator was sending the selecting impulses to the group and final selectors.

In the system described herein a set of selector control relays is used of which the release and change over relays have their battery circuit normally open, the closure of this battery circuit taking place at the moment the slow-acting finder associated with the group selector to which the set of relays belongs is moved out of its normal position.

My invention will be fully understood from the following description and by reference to the accompanying drawing in which—

Figures 2, 6:
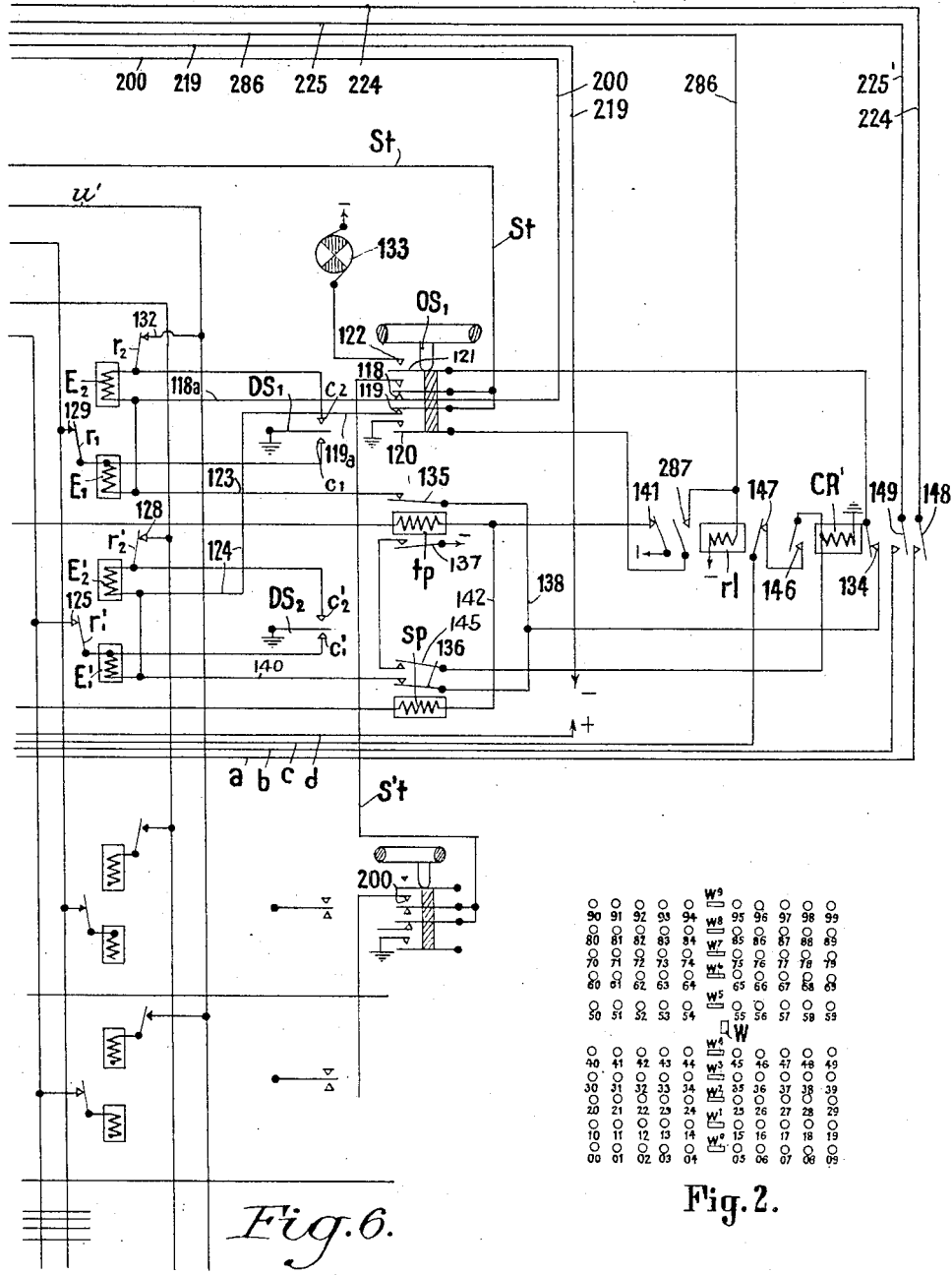
Figure 4:
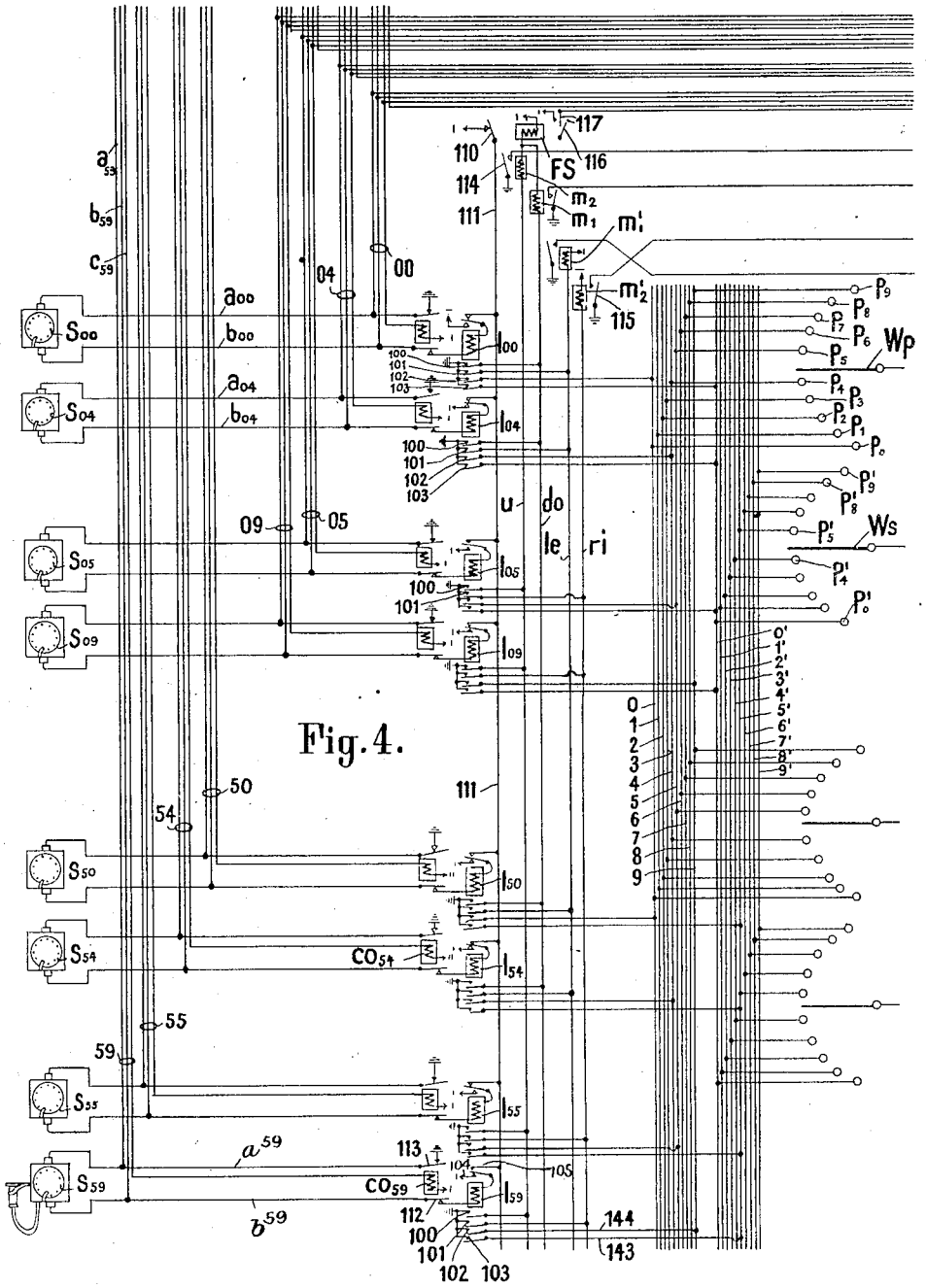

Figure 1 is a general diagrammatic representation of the new system,

Fig. 2 indicates diagrammatically the arrangement of the bank contacts and movable brushes of a quick-acting finder and the order in which the lines of a group are connected to the bank contacts of the quick-acting finders belonging to that group, Fig. 3 shows partly in perspective view and partly diagrammatically the construction of a quick-acting line finder, Fig. 4 illustrates the circuits of the subscribers' line and cut-off relays, the connections between the subscribers' line relays and the groups of permutations or guide wires used for guiding the quick-acting line finders to a calling line, and the circuits of a finder starter, Fig. 4$^a$ represents connections that join at the top to corresponding wires of Fig. 8, at the bottom to the wires of Fig. 4 and at the right to wires $d55$, $c55$, $b55$, $a55$, etc., issuing from Fig. 5.

Figs. 5 and 6 show the circuits of the quick-acting line finders.

Figure 7:
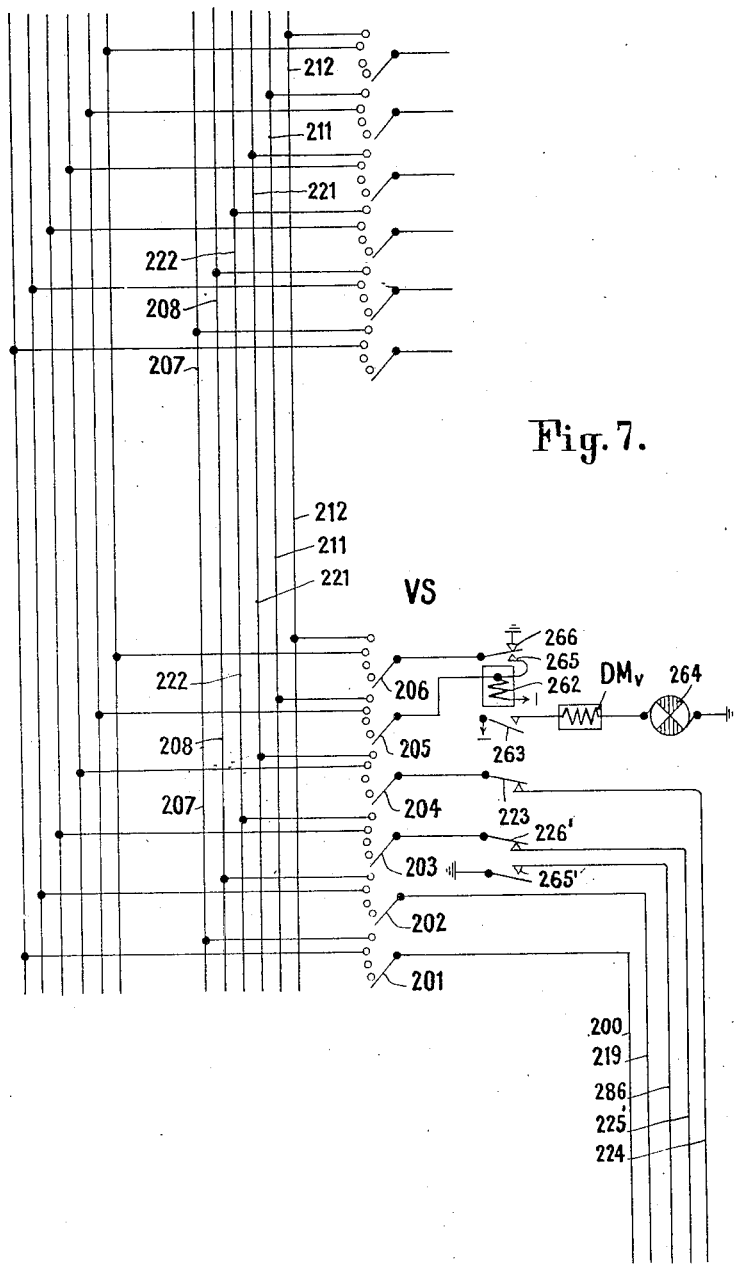

Fig. 7 indicates the circuits of the selector finders,

Fig. 8 shows the circuits of the slow-acting finders,

Fig. 9 the circuits of a group selector,

Fig. 10 the circuits of a final selector or connector.

Fig. 11 is a simplified showing of the circuits by which the slow-acting finders are caused to connect to a calling line and Figs. 12 and 12$^a$ show circuits for preventing more than one slow-acting finder from connecting to a calling line at the same time.

A complete diagram of the whole system is obtained by placing Figs. 4, 5 and 6 beside each other and Fig 4$^a$ above Fig. 4, Fig. 7 over Fig. 5, then Fig. 8 over Fig. 3, Fig. 9 over Fig. 7 and finally Fig. 10 beside Fig. 9.

The manner in which connections are established with the new system can be explained in a general way by the aid of Fig. 1.

The subscribers $T_1$, $T_2$, etc., are all connected to the bank contacts of three different kinds of switches, viz. the quick-acting finders F, the slow-acting finders LF and the final selectors LW. If there are more than one group of subscribers in the exchange group selectors GW will be provided in the manner indicated.

When a subscriber calls by removing his receiver from its switchhook a quick-acting finder F immediately (or after it has executed a short movement) establishes a connection between the calling subscriber (e. g. $T_1$) and a group selector GW by the aid of a selector finder VS which always keeps the finder F associated with it connected to an idle group selector GW or slow-acting finder LF.

The calling subscriber now causes the group selector GW to select the desired group and obtains a connection with an idle final selector LW in that group. The moment the subscriber calls the slow-acting finder LF associated with the group selector GW is started and while the group selector is executing its selecting function the slow-acting finder will be carrying out its operation of finding the calling line. When the slow-acting finder and the group selector have executed their functions the connection through the quick-acting finder F and the selector finder VS is dissolved so that only the connection through the slow-acting finder LF remains. The subscriber (or semi-automatic operator) now sends the remaining selecting impulses, which may be required for putting the final selector LW onto the desired line (e. g. $T_2$), through the slow-acting finder LF and through the group selector GW to the final selector.

If the groups of subscribers are large e. g. if they contain as many as four hundred subscribers it will happen that a slow-acting finder will take a comparatively long time to find the calling line $T_1$. In order to gain this time the circuits for "casting off" or disconnecting the quick-acting finders from the first group selectors may be arranged so that they act only after the second selectors or even the final selectors have carried out their selecting functions.

In the representation of the invention shown in this specification the casting off circuit acts when a final selector has half done its work i. e. after it has selected the row of contacts containing the wanted subscriber's line.

In Fig. 2 are illustrated the ten rows of contacts of a hundred point quick-acting line finder. The hundred lines of a hundred group are connected in the order indicated by the numbers. For example the lines numbered from 00 to 09 are connected to the bank contacts of the first row. The lines numbered 10 to 19 are connected to the second row of bank contacts and so forth. All the lines with units digits ranging from 0 to 4 are connected to the left half of the contact bank and all the lines with units digits from 5 to 9 are connected to the right half of the bank.

For each row of contacts there is a wiper $w_0$ to $w_9$. The line finder is so arranged that according as the subscriber calling is connected to the left or right half of the contact bank the wipers $w_0$ to $w_9$ will move from their middle position to the left or right. The farthest distance that the wipers will have to travel is thus the distance of five contacts.

The wipers $w_0$ to $w_9$ are normally insulated so that no connection is made to the calling line by these wipers alone. There is, however, another wiper W that is connected to a trunk or link circuit which coöperates with the wipers $w_0$ to $w_9$. This wiper W moves toward the upper or lower half of the contact bank according as the calling line appears in the upper or lower half. The wiper W stops moving when it reaches the wiper $w_0$ to $w_9$ that is situated in the row containing the bank contacts of the calling lines. The greatest number of rows traversed by the wiper W is five. Both the set of wipers $w_0$ to $w_9$ and the wiper W travel simultaneously. Therefore the maximum time required for the finding of any one line out of a hundred is the time that a wiper $w$ or W takes to move five steps and the average time required is the time needed for 2.5 steps.

A means which may be used for propelling the wipers $w_0$ to $w_9$ of the quick-acting line finders is shown in Fig. 3 in which S is a wiper shaft bearing the wipers $w_0$ to $w_9$ and journaled in a bearing $b$. At the bottom end of the wiper shaft is fixed a disk $d$. This disk $d$ is driven by another disk $d_1$ or $d_2$ fixed to a driving shaft $S_1$ that may be common to a large number of finders or selector switches. $e_1$ and $e_2$ are solenoids which on being energized by an electric current magnetize their respective disks $d_1$ or $d_2$ and then attract the other rim of the flexible disks $d$ to their respective disks $d_1$ or $d_2$. The shaft $S_1$ with the disks $d_1$ and $d_2$ rotates in the direction indicated by the arrow $(a)$ so that when $d_1$ is magnetized the wipers $w_0$ to $w_9$ will rotate toward the left of the contact bank and when $d_2$ is magnetized these wipers will be rotated toward the right half of the contact bank. The wipers $w_0$ to $w_9$ each consist of a pair of brushes of which the upper one engages with the contacts belonging to the various subscribers contained in its particular row and the lower one slides upon a continuous contact piece, e. g., $p_0$. Each contact piece $p_0$ to $p_9$ is connected to the fixed contact of a secondary switch SW. The secondary switch is constructed like the primary switch PS just described, except that it has only one row of bank contacts and one wiper W instead of ten. The wiper W is moved by its solenoids or magnets $e^1_1$ or $e^1_2$ toward its lower or upper five contacts connected to the lower or upper five contact pieces $p_0$ to $p_4$ or $p_5$ to $p_9$ respectively.

Fixed to the upper end of the shaft S is a disk $d_3$ having an oblique slot $l$ at its periphery. Projecting into this slot is a tongue $t$ attached to a switch $ds$. When the shaft S is rotated in the direction of the arrow $a_2$ the tongue $t$ slides up onto the top of the disk $d_3$ and causes the switch $ds$ to close its top contact $c_1$, but when the shaft S is turned in the direction of the arrow $a_1$ the tongue $t$ slides down and rides on the bottom of the disk $d_3$ and closes the contact $c_2$ of the switch $ds$. This switch is used when restoring the finder to its normal position as will be fully described later. The secondary switch SW is also provided with a switch similar to $ds$, but this is not shown in Fig. 3.

The shaft S of the quick-acting finder also has a cam $d_4$ which moves an off-normal switch OS the functions of which will be fully described later.

Although for simplicity of illustration only one wiper $w$ and one set of bank contacts per row is shown in Figs. 2 and 3., three wipers and three sets of contacts per row are used, and on the secondary switch SW four wipers W and four sets of bank contacts are provided as shown in the circuit diagram in Fig. 4.

In Fig. 4 $S_{00}$, $S_{04}$, $S_{05}$, etc., represent the subscribers' stations of a group of one hundred subscribers. The stations $S_{00}$, $S_{04}$ and $S_{05}$, $S_{09}$ represent the first and fifth, and sixth and tenth stations of the first tens group in the hundred, this tens group being connected to the sets of bank contacts numbered 00 to 09 as shown in Fig. 2 and located in the first row of each line finder of the hundred group. For simplicity of illustration only two stations 04, 05 are shown connected to bank contacts in the lower halves of the contact banks of the finders $F_1$, $F_2$, Fig. 5.

$S_{50}$, $S_{54}$, $S_{55}$ and $S_{59}$ represent four stations connected to the upper halves of the finder contact banks. Of these also only two $S_{54}$, $S_{55}$ are shown connected to their bank contacts.

The first quick-acting finder $F_1$ of the hundred group is represented by four of its ten sets of wipers $wa0$, $wb0$, $wc0$, $wd0$—$wa1$, $wb1$, $wc1$, $wd1$—$wa5$, $wb5$, $wc5$, $wd5$—$wa6$, $wb6$, $wc6$, $wd6$, belonging to the primary switch and the set of wipers $w^1$ belonging to the secondary switch of the finder. The primary and secondary switches each have an additional wiper $W_p$ and $W_s$. $E_1$ and $E_2$ are the motor magnets of the primary switch and $E^1_1$ and $E^1_2$ represent the motor magnets of the secondary switch of finder $F_1$. $DS_1$, Fig. 6, is the switch corresponding to $ds$, Fig. 3, belonging to the primary switch $DS_2$ a similar switch belonging to the secondary switch of the quick-acting finder $F_1$. $OS_1$ is an off-normal switch on finder $F_1$. $tp$ and $sp$ are test relays and $r^1$ is a release relay of finder $F_1$. The release relay controls four switches, $r_1$, $r_2$, $r^1_1$, $r^1_2$ which, in order to simplify the drawing, are shown near the motor magnets E that they control. The switches are shown in their normal position. When the release relay $r^1$ is energized it moves these switches from their back contacts to their front contacts.

The finder $F_1$ is also provided with a connecting relay CR which extends the line of a calling subscriber to the next switch or selector, Fig. 7, the moment the finder has found the calling line.

There are as many quick-acting finders in a hundred group as required for the moment of maximum traffic, say two or three. $F_2$ represents another quick-acting finder in the same hundred group. Only as many of the parts of this finder are shown as are sufficient to make the system comprehensible. The function of the wipers $W_p$ and $W_s$ of the primary and secondary switch of each finder is to guide the wipers $w_a$, $w_b$, $w_c$ and $W^1$ to the bank contacts that are connected by wires such as 04, 05, etc., to a calling line. The wipers $W_p$, $W_s$ will therefore be called "guiding wipers." The guiding wipers travel over contacts $p_0$ to $p_9$ and $p^1_0$ to $p^1_9$ which are connected to two sets of "permutation wires" 0 to 9 and $0^1$ to $9^1$ the functions of which will be explained presently. The bank contacts $p_0$ to $p_9$ and $p_{10}$ to $p^1_9$ of all the finders of a hundred group are connected in multiple to the groups of permutation wires, 0—9 and $0^1$—$9^1$. Each hundred group has its own two groups of permutation wires.

Each of the hundred subscribers of a hundred group is connected by a set of multiple wires such as 04 or 05 to a set of bank contacts in each quick-acting finder $F_1$, $F_2$ of the group, these sets of bank contacts being traversed by sets of brushes $wa$, $wb$, $wc$, $wd$.

The subscribers' lines are connected to the bank contacts in the order illustrated in Fig. 2. Subscriber $S_{00}$ is connected to the first set of bank contacts in the first row, $S_{01}$ is connected to the second set of contacts in the first row, $S_{02}$ to the third set in first row and so forth. In Fig. 5 only the connections of two subscribers, 04 and 05 in the first row and two subscribers, 54 and 55, in the sixth row of bank contacts are fully shown.

The wipers $wa0$, $wb0$, $wc0$, $wd0$ traverse the first row, wipers $wa1$, $wb1$, $wc1$, $wd1$ the second row, wipers $wa5$, $wb5$, $wc5$, $wd5$ the sixth, wipers $wa6$, $wb6$, $wc6$, $wd6$, the seventh row of bank contacts. The wipers and bank contacts of the third, fourth, fifth, eighth, ninth and tenth rows are omitted in order to simplify the drawing.

The wipers $wa0$, $wb0$, $wc0$, $wd0$ of the first row are connected by a set of wires $w^1_0$ to the first set of bank contacts on the secondary switch of the finder, the wipers $wa1$, $wb1$, $wc1$, $wd1$, of the second row to the second set and so forth.

In order to connect a certain subscriber's line, as 04 to a trunk line $a$, $b$, $c$, $d$ leading to a selector, Fig. 7, all the sets of wipers $wa0$, $wb0$, $wc0$, $wd0$, $wa1$, $wb1$, $wc1$, $wd1$, etc., are turned so as to bring one of the sets of wipers e. g. $wa0$, $wb0$, $wc0$, $wd0$ onto the set of bank contacts that is connected to the line 04 and the set of secondary wipers $W^1$ is turned so as to connect to the set of primary wipers e. g. $wa0$, $wb0$, $wc0$, $wd0$, that is touching the subscriber's line. The subscriber's line, 04, will then be connected through $wa0$, $wb0$, $wc0$, $wd0$, $W^1_0$—$W^1$ to the trunk $a$, $b$, $c$, $d$.

If a calling subscriber's line is connected to a set of bank contacts located in the half of the contact bank shown above the sets of wipers $wa0$, $wb0$, $wc0$, $wd0$, $wa1$, $wb1$, $wc1$, $wd1$, etc., a motor magnet $E_2$, similar to $e_2$, Fig. 3, will come into action and will move all the wipers toward the upper half of the bank. If the subscriber's line is connected to the lower half of the bank the motor magnet $E_1$, similar to $e_1$, Fig. 2, will be energized and will move all the wipers of the primary switch toward the lower half.

If the calling subscriber is connected to the half of the contact bank shown at the left of the line $x$—$y$ the wipers $W^1$ of the secondary switch will be moved by the motor magnet $E^1_1$ to the sets of contacts connected to the wipers $wa0$, $wb0$, $wc0$, $wd$, $wa1$, $wb1$, $wc1$, $wa1$, $wa4$, $wb4$, $wc4$, $wa4$, located at the left of the line $x$—$y$ and if the calling subscriber is connected to a set of bank contacts situated at the right of the line $x$—$y$ the wipers $W^1$ will be moved by the motor magnet $E^1_2$ toward the secondary bank contacts that are connected to the sets of wipers $wa5$, $wb5$, $wc5$, $wa5$ to $wa9$, $wb9$, $wc9$, $wd9$ located at the right side of the line $x$—$y$.

The direction of movement of the wipers is thus dependent on the part of the contact bank of the quick-acting finder that a calling subscriber is connected to. The subscribers unconsciously determine these directions of movement by means of relays $m_1$, $m_2$ and $m^1_1$, $m^1_2$ and by circuits connected to their line relays $l_{00}$, $l_{04}$, etc.

The relays $m_1$, $m_2$ determine the direction of movement of the primary switch wipers $wa0$, $wb0$, $wc0$, $wd0$, etc., and the relays $m^1_1$, $m^1_2$ determine the direction of movement of the secondary switch wipers $w^1$.

All the subscribers with units digits ranging from 0 to 4 are connected to the bank contacts shown in Fig. 5 in the lower half of the bank. Therefore all these subscribers are arranged to control by the first lower armature contacts 100 of their line relays the circuit $do$ of the relay $m_1$ which closes the circuit of the motor magnet $E_1$ and thus causes the downward movement of the wipers of the primary switch.

The corresponding line relay contacts 100 of all the subscribers with units digits ranging from 5—9 are connected to the circuit U of the relay $m_2$ that closes the circuit of the "upward motion magnet", $E_2$, for all the subscribers with these units digits are connected to the upper half of the bank.

All the subscribers of the group with tens digits ranging from 0 to 4 are connected to bank contacts shown in Fig. 5, at the left side of the line $x-y$, the wipers $W^1$ of the secondary switch are moved toward the wipers $w_a$, $w_b$, $w_c$ $w_d$ etc., by the motor magnet $E^1_1$ which is controlled by the relay $m^1_1$. Therefore all the subscribers with tens digits ranging from 0 to 4 are connencted by the contacts 101 of their line relays to the circuit $1_e$ connected to the "leftward motion relay" $m^1_1$.

All the subscribers with tens digits ranging from 5 to 9 are connected to bank contacts shown at the right side of line $x-y$ in Fig. 4. The motor magnet $E^1_2$ that causes the wipers $W^1$ to travel toward the primary wipers in the right half of the bank is controlled by the "rightward motion relay" $m^1_2$ and therefore all the subscribers with tens digits ranging from 5 to 9 are connected by their armature contacts 101 to the circuit $(ri)$ of the right ward motion relay $m^1_2$.

It is thus seen that the relays $m_1$, $m_2$ indicate whether the calling subscriber is connected to the upper or lower half of the contact bank and that the relays $m^1_1$, $m^1_2$ indicate whether the subscriber is in the right or left half of the bank.

The relays $m_1$, $m_2$; $m^1_1$, $m^1_2$ taken together indicate what quarter of the contact bank the subscriber is in. If the subscriber is in the lower left hand quarter for example the relays $m_1$ and $m^1_1$ would be energized so as to energize the motor magnets $E^1$ and $E^1_1$.

The particular line in the quarter of the contact bank indicated by the relays $m_1$, $m_2$, $m^1_1$, $m^1_2$ is indicated by means of the permutation wires 0 to 9 and $0^1$ to $9^1$. The permutation wires 0 to 9 determine the point $p_0$ to $p_9$ at which the primary guiding wiper $W_p$ shall stop and the permutation wires $0^1$ to $9^1$ determine the point of stoppage of the secondary guiding wiper $W_s$.

The permutation wires 0 to 9 and $0^1$ to $9^1$ correspond to the units and tens digits respectively of the calling subscribers. The contact 102 of the line relay $1_{00}$ of subscriber 00 is connected to the units permutation wire 0 and contact 103 of this relay is connected to the tens permutation wire $0^1$. The contacts 102 and 103 of subscriber 01 are connected to tens permutation wire $0^1$ and to units permutation wire 1 respectively. Thus the connections between the permutation wires and the line relay contacts 102 and 103 of the hundred subscribers differ so as to produce hundred different permutations, and each permutation represents a different combinative setting of the primary and secondary switches of a finder $F_1$, $F_2$. Thus if subscriber 05 calls the primary switch of the finder will be moved so as to bring the guiding wiper $W_p$ into connection with the units permutation wire 5 and the secondary guiding wiper $W_s$ will be moved into connection with the tens permutation wire $0^1$ and as the sets of brushes $wa0$, $wb0$, $wc0$, $wd0-wa1$, $wb1$, $wc1$, $wd1$, etc., and $W^3$ are moved in unison with their guiding wipers the subscriber 05 would be connected through the sixth set of bank contacts that is connected in the first contact row to the wires 05 and through $wa0$, $wb0$, $wc0$, $wd0-W^1_0$ $W^1$ to the trunk $a$, $b$, $c$, $d$.

It will now be assumed that a subscriber e. g. No. 59 makes a connection with another subscriber.

When the calling subscriber S 59 removes his receiver from the switchhook he closes his line loop $a_{59}$, $b_{59}$ in a well known manner and his line relay $l_{59}$ is then energized by a current flowing from the negative pole of the exchange battery through the contact 110 of the finder started FS, common feed wire 111, contact 105 of line relay $l_{59}$, 112, $b_{59}$, $a_{59}$, 113 to earth. Line relay $l_{59}$ is energized and opens its contact 105 while closing its contacts 100, 101, 102, 103 and 104.

Since the subscriber $S_{59}$ is connected to a set of bank contacts located in the upper half of the contact bank and to the right of the line $x-y$ the upward motion relay $m_2$ and the rightward motion relay $m^1_2$ must be energized in order to set the finder onto the calling line. Therefore the armature contacts 100 and 101 of the line relay $l_{59}$ are connected to the circuits $u$ and $ri$ and the relays $m_2$ and $m^1_2$ are energized by circuits from the negative pole of the battery through FS, $m_2$, $u$, 100 to earth and from the negative pole through $m^1_2$, $ri$, 101 to earth. At the same time the tens permutation wire $5^1$ and the units permutation wire 9 are earthed by contacts 103 and 102 respectively.

The upward motion relay $m_2$ closes its armature contact 114 and prepares a circuit for the upward motion magnet $E_2$, and the rightward motion relay $m^1_2$ prepares a circuit at its contact 113 for the rightward motion magnet $E^1_2$. The finder starter FS is energized in series with the relay $m_2$ and by attracting its armature 116 momentarily closes the contact 117. This causes a current impulse to flow from the negative pole through 117, starting wire ST, contacts 119, 118 of the off-normal switch of the first idle finder (e. g. F 1), wires 124 and $118^a$ magnets $E^1_2$ and $E_2$, contacts 128 and 132, wires $r\ i^1$, $u_1$, contacts 115 and 114. The magnet $E^1_2$ is energized and moves the wipers $W^1$, $W_s$ of the secondary switch one step toward the right hand wiper wires $w^1_5$, $w^1_6$ and the magnet $E_2$ is also energized and moves the wipers $wa0$, $wb0$, $wc0$, $wd0-wa^1$ $wb^1$, $wc^1$, $wd^1$, etc., and the guiding wiper $W_p$ of the primary switch one step upward.

It will be assumed for convenience of description that the magnets $E_1$, $E_2$, $E^1_1$, $E^1_2$ move their wipers by a step by step ratchet and pawl device so that for each impulse sent through these magnets their wipers are moved to another set of bank contacts.

It will be noticed that two magnets $E_1$ and $E_2$ are connected to the wire $118^a$ and two magnets $E^1_1$ and $E^1_2$ to the wire 124. The impulse sent from the finder starter FS over the starter wire ST will, however, always affect one of the magnets $E_1$ or $E_2$, and one of the magnets $E^1_1$ or $E^1_2$ only, because there will always be only one circuit of each pair of motor magnets closed by the relays $m_1$, $m_2$, $m^1_1$, $m^1_2$.

On the primary switch of the finder being moved out of its normal position the off-normal switch $OS_1$ closes its contacts 120, 121 and 122 and opens its contacts 118 and 119. The primary switch is arranged to execute its initial movement when the starting impulse over the starting wire $S_t$ ceases, so that the contact 121 through which the starting wire is extended to the next finder $F_2$ is not closed before the starting impulse ceases and a false starting of the next finder $F_2$ does not occur.

When the contact 122 is closed an interrupter 133 is connected to the motor magnets in place of the starting wire and current impulses then flow from the negative pole through 133, 134 to the wire 128. From the wire 138 the impulses flow through the wires 139 and 140 to the pairs of magnets $E_1$, $E_2$—$E^1_1$, $E^1_2$. Only the circuit of one magnet in each pair is closed by the relay $m_1$, $m_2$, $m^1_1$, $m^1_2$ at any one time. In the case assumed the circuits of magnets $E_2$ and $E^1_2$ are closed at 114 and 115 respectively. Therefore the impulses flowing through the wires 139 and 140 will energize only the magnets $E_2$ and $E^1_2$ causing the wipers of the primary and secondary switches to be both moved upwardly.

It will of course happen that both switches will move downwardly, or that the primary switch will move its wipers downwardly while the secondary switch moves its wipers upwardly and vice versa.

In the case assumed the wipers $W^1$ will move upward one step and the circuit of the magnet $E^1_2$ will then be broken by the energization of the secondary test relay $sp$, for a circuit will be established for this relay by the secondary guiding wiper $W_s$ reaching the tens permutation wire $5^1$. This circuit may be traced from the negative pole through 141, 142 $sp$, $W_s$, $p^1_5$, $5^1$, 143, 103 to earth. On the energization of relay $sp$ the circuit of magnet $E^1_2$ is broken at 136 and the motion of wipers $W^1$, $W_s$ is stopped.

The wipers of the primary switch will continue their movement until the guiding wiper $W_p$ reaches an earthed permutation wire, which in the case assumed will be when the permutation wire $q$ is reached. The circuit of the primary test relay will then be closed from the negative pole through 141, $tp$, $W_p$, $q$, 144, 102 to earth, and the test relay $tp$ will open the circuit of the magnet $E_2$ at contact 135, thus stopping the operation of this magnet. The wipers $wa5$, $wb5$, $wc5$, $wd5$, will now be resting on the set of bank contacts $bc59$ to which the subscriber $s59$ is connected, and the set of wipers $W_1$ will be resting on the secondary switch contacts connected by $W^1_5$ to $wa5$, $wb5$, $wc5$, $wd5$. Thus the calling line will be connected through its wires 59, $bc59$, $wa5$, $wb5$, $wc5$, $wd5$—$W^1_5$, $W^1$ to the trunk $a$, $b$, $c$, $d$.

The moment both test relays $sp$, $tp$ are energized, a circuit is closed from the negative pole through 137, 145, CR to earth and the connecting relay CR then closes its contacts 146, 148, 149 while opening its contact 134. By the closure of contacts 148, 149 the calling line is extended to the selector VS and the closure of the contact 146 results in the energization of the calling subscriber's cut-off relay $co_{59}$ by a current from earth through CR, 146, 147, $c$, lower brush of $W^1$, $Wc^5$, bank contact of line 59 on which $Wc^5$ is resting, wire $c^{59}$ connected to this bank contact, cut off relay $co_{59}$ to the negative pole of the battery. The cut off relay is energized and cuts the line relay $l_{59}$ off of the calling line $a_{59}$, $b_{59}$, thus deënergizing the line relay.

As long as a line relay is energized the upward motion relay $m_2$ or the downward motion relay $m_1$ will be energized in series with the finder starter and the finder starter will keep open the common battery feed 111 to all the line relays of the hundred at 110 and thus prevent any other subscriber in the group from calling. But this condition only lasts until a finder $F_1$, $F_2$, etc., has made a connection with the calling line and as the average time required for this is the time that it takes the wipers to execute 2.5 steps, the blocked condition of all the lines except the first one to send in a call only lasts a fraction of a second, and a second subscriber sending in a call would not notice any delay.

Each quick-acting finder is always kept connected to an idle slow-acting finder LF or to an idle group selector GW by a selector finder VS, Fig. 7, as will be presently more fully described. At the moment a quick-acting finder (e. g. $F_1$) is started by a starting impulse sent through the starting wire $St$ the slow-acting finder LF to which the quick-acting finder is connected by the selector finder VS is also started by an impulse which flows from the negative pole of the battery through contact 117 of the finder starter, St, 118, wire 200, contact arm 201, 207, contact 213 of the off-normal switch $OS_2$ of the slow-acting finder LF, motor magnet 214 of the slow-acting finder, 215, 216 to earth. Due to this current impulse the set of brushes $af$, $bf$, $cf$, $df$ is moved by the rotary magnet 214 out of its normal position whereupon the off-normal switch $OS_2$ closes its contact 217 and causes an interrupter 218 to be connected to the motor magnet 214. Current impulses will then flow from the negative battery pole through 218, 217, 214, 215, 216 to earth and these impulses will cause the motor magnet 214 to alternately attract and detract its armature and to move the set of brushes $af$, $bf$, $cf$, $df$ so as to cause it to trail over the fixed sets of contacts of the slow-acting finder until the contact set is found to which the calling line $l_{59}$ is connected. As soon as this line is reached a current will flow from the negative battery pole through 219, contact arm 202 of the selector finder 208, relay 220, brush $df$, line $df_{59}$, brush $wd_5$, middle brush of $W^1$, wire $d$ to the positive pole. The relay 220 then opens its contact 216 and thus breaks the circuit of the motor magnet 214 causing the slow-acting finder LF to stop on the line of the calling subscribed $s_{59}$.

The moment the quick-acting finder $F_1$ established the connection with the calling line the line control relay LR in the group selector was energized by a current that commenced flowing from the battery B through the upper winding of the relay LR, $a_1$, 221, 204, 223, 224, 148, $a$, brush set $W^1$, $wa_5$, $a_{59}$, calling subscriber's station $S_{59}$, $b_{59}$, $wb_5$, brush of brush set $W^1$, $b$, 149, 225, 226, 203, 222, $b_1$, 223, lower winding of relay LR, back to battery B. The line control relay is energized by this current and closes its contacts 225, 228 while opening its contacts 226, 227. Meanwhile the relay 231 will also have been energized by a current through 231, 232, contact 233 of the off-normal switch $OS_2$ to earth. Thus as soon as the relay LR is energized a current flows from the negative battery pole through 234, release relay RR, contact 228, wire 235 to earth. The release relay closes its contacts 236 and 237 and opens its contact 238. The contact 236 closes the circuit of the relay 239 of the slow-acting finder which may be traced from earth through 236, 240, 239, brush $cf$, wire $cf_{59}$, cut-off relay $co_{59}$ to the negative pole. Thus the cut-off relay $co_{59}$ now receives current over two paths, the one leading from earth through 236 and relay 239, and the other from earth through the relay CR, contact 146, 147, wire $c$, etc., over the path already traced.

As soon as the cut-off relay $co_{59}$ is energized by the current that flows through the relay CR the line relay $l_{59}$ of the calling line is deënergized and opens its own locking circuit at its contact 104 and also the circuits of the relays $m_2$ and $m^1_2$ that control the circuits of the motor magnets of the quick-acting finder. The line relay also disconnects the permutation wires $5^1$ and 9 from earth. The finder starter FS is also deënergized and reconnects the common battery lead 111 to the other line relays of the group at 110. The retraction of the armature 116 does not, however, cause a closure of the starting circuit by the contact 117.

The opening of the earth connections of the permutation wires $5^1$ and 9 causes the deënergization of the test relays $sp$ and $tp$ and these relays by closing their contacts 135 and 136 prepare the circuits of the motor magnets of the quick-acting line finder the complete closure of these circuits being prevented by the contact 134 being kept open by the relay CR.

The connecting relay CR is still kept energized by the current which flows from earth through CR, 146, 147, $c$, $wc_5$, $c_{59}$ and $co_{59}$ to the negative battery pole.

If another subscriber in the same group were now to call another quick-acting finder $F_2$ would connect to the line of this subscriber and extend it to another idle slow-acting finder LF or group selector GW.

If the subscriber that has been connected in the manner described to an idle group selector GW desires a connection with subscriber No. 354 he first sends a series of three impulses through the relay LR. At each interruption of the line loop of the calling subscriber the line control relay LR lets its armature drop back so as to close a circuit from the negative pole through 234, 226, 241, 237, lifting magnet HM of the group selector to earth. The lifting magnet is energized three times and lifts its set of brushes $ag$, $bg$, $cg$ to the third contact row of the selector which for convenience will be assumed to be of the well known Strowger type. After the third interruption of the calling subscriber's loop the loop is kept steadily closed and the line control relay keeps its armature attracted so that the change over relay CR, which is energized during the oscillations of the armature of the line control relay by a current flowing from the negative pole through 234, RR, CR to earth, is steadily short circuited by the contact 228 and lets its armature drop back. The contact spring 242 then presses against contact 230 and moves it away from the contact 229. A short circuit closure is effected during which an impulse flows from the negative pole through 234, 225, 229, 230, 242, 243, side switch magnet $SM^1$, to earth. The off-normal contact 243 is closed the moment the group selector executes its first vertical step. By the impulse through the side switch magnet $SM^1$, the contact arms 223, 224, 244, 245, 246, 247, 248, 249, 250, 251, 252, 253 are shifted from their first positions to their second positions. The contact arm 245 closes in its second position the circuit of the rotary magnet DM and impulses now flow from the negative pole of the battery through the interrupter 254, 245, DM to earth.

The side switch of the group selector has a second shifting magnet $SM_2$, the armature of which is controlled by the rotary magnet DM as is usual in Strowger selectors so that on the first attraction of the armature of the rotary magnet not only the brushes or wipers $ag$, $bg$, $cg$ are turned one step but also the armature of the side switch magnet $SM_2$ is pressed against its pole piece. When the brushes $ag$, $bg$, $cg$ reach the first set of bank contacts or trunk the side switch magnet $SM_2$ will, if this trunk is busy, keep its armature attracted because it will be energized by a current that will flow from an earth connection in another group selector that has already seized the trunk $cv$, release relay 255 of this group selector, contact arms 246 and $cg$ of the same, wire $cv$, brush $cg$, wire 256 of the group selector that is hunting for a free trunk, contact 246 and side switch magnet $SM_2$ of this selector to the negative pole. The brushes $ag$, $bg$, $cg$ are stepped around step by step in a known manner until an idle trunk is found when the brush $cg$ will engage with a trunk wire $cv$ that is only connected to the negative battery pole through a relay 258 having a very high resistance. The side switch magnet $SM_2$ will then let its armature drop back thereby causing the contact arms of the side switch to shift into their third positions. This opens the circuit of the rotary magnet DM and disconnects the line control relay LR from the line of the calling subscriber. The brush $cg$ is connected through release relay 255 of low resistance to earth and the trunk $av$, $bv$, $cv$ is thus rendered engaged. In consequence of the disconnection of the line control relay LR from the line $a$, $b$, this relay and also the relay RR are deënergized. If the relay RR is deenergized before the side switch moves from the second to the third position the release magnet AM of the group selector is energized by a current from earth through 238, 260, 253, AM to the negative pole of the battery. Therefore, if the calling subscriber were to replace his receiver on its switchhook before the group selector has had time to find an idle trunk $av$, $bv$, $cv$ the closure of the contact 238 due to the deenergization of the release relay RR would cause the group selector GW to be restored to its normal position. This would also result in the restoration of the slow-acting finder LF in the manner to be presently described. The energization of the release magnet AM would cause the closure of the circuit of the starting relay 262 of the selector finder VS, Fig. 7 which may be traced from the positive pole or earth through contact 261, wire 211, contact arm 205 of the selector finder, relay 262 to the negative pole. The starting relay 262 closes its contact 263 and a current impulse then flows from the negative battery pole through 263, rotary magnet $DM_v$, interrupter 264 to earth. The rotary magnet $DM_4$ shifts the contact arms 201, 202, 203, 204, 205, 206 one step forward and if the next trunk or group selector is busy the locking circuit of the starting relay will be kept closed. This locking circuit may be traced from the negative pole of the battery through 262, 265, contact arm 206, wire 212, leading to the next group selector and then either through the contact 236 or through the contact 250 of the next group selector to earth. If the trunk leading to the next group selector has already been seized by another selector finder the locking circuit of the starting relay 262 may also be completed through the contact arm 206 of this other selector finder and through the contact 266 of the same to earth. But as soon as a free trunk is found by the selector finder the locking circuit of the relay 262 of the selector finder will not be closed through a contact 236 nor through a contact arm 250 nor through a contact 266. The starting relay 266 then lets its armature drop back and opens the circuit of its rotary magnet $DM_v$ at the contact 263. The selector finder stops and connects the quick-acting finder $F_1$ associated with it to an idle group selector GW.

When the starting relay 262 is energized a contact 265 is closed by which the restoring relay $rl$ of the quick-acting finder $F_1$ is energized. The restoring relay $rl$ then causes the quick-acting finder $F_1$ to return to its normal position in the manner to be described later.

The operations involved in the establishment of a connection between the subscriber $S_{59}$ and the subscriber No. 354 have been described up to the stage in which the group selector GW found a trunk $av$, $bv$, $cv$ leading to an idle final selector LW. By the shifting of the side switch of the group selector GW from its second to the third position the line $a_1$, $b_1$ is extended to the trunk $av$, $bv$ and at the same time a relay 259 is connected to the limb $b_1$ of the talking circuit in the group selector. A circuit will then be closed from the negative battery pole through relay 259, 251, $b_1$, 222, 203, 226, 225, 149, $b$, brush of the brush set $W^1$, $wb_5$, $b_{59}$, subscriber's station $S_{59}$, $a_{59}$, $wa_5$, brush of brush set $W^1$, $a$, 148, 224, 223, 204, 221, $a_1$, 247, $ag$, $av$, upper winding of the line control relay $LR_1$ to earth. The relays $LR_1$ and 259 are energized.

At the moment the relay 259 is applied to the wire $b_1$, the contact arm 252 of the side switch also prepares the circuit of a slow-acting relay $261^a$. The circuit is opened before the relay 261 has time to close it by the energization of the relay 259 and the consequent opening of the contact 263.

The calling subscriber now sets the wipers of the final selector onto the tens group containing the wanted line by working his selector controller and thus causing a series of five interruptions of his line loop. At each interruption an impulse flows from the negative pole through 266, 269, 270, 271, 272, lifting magnet $HM_1$ of the final selector to earth and the brushes of the final selector which, for convenience, will be assumed to be built like a Strowger selector, are lifted to the fifth contact row.

The interruptions of the calling line loop cause deënergizations of the relay 259. At each deënergization the relay $261^a$ is energized by an impulse that flows from the negative pole through 252, 263, $261^a$ to the positive battery pole. It attracts its armature 264 and thus closes the circuit of the side switch magnet $SM_2$ (earth, 264, $SM_2$, negative pole). The relay $261^a$ is slow-acting and keeps its armature contact 264 closed in spite of the openings of contact 263. But when the tens selecting impulses have all been sent in and the calling subscriber's loop is again steadily closed, the contact 263 is opened for a considerable time, so that the relay $261^a$ is given time to release its armature and to open the circuit of the side switch magnet $SM_2$. This magnet then lets its armature drop back and causes all the contact arms of the side switch to shift from their third to their fourth positions. This results in the relay 259 being disconnected from the wire $b_1$.

The contact arm 249 of the side switch earths the wire 211 and thereby energizes a relay 280 in the slow-acting finder and the starting relay 262 in the selector finder. The circuit of relay 280 may be traced from earth through 249, 281, 282, 280 to the negative battery pole. The relay 280 closes the contacts 283, 284 and 285. By its contacts 283, 285 it establishes a connection between the calling subscriber and the final selector LW.

The circuit of the starting relay may be traced from earth through 249, 211, 205, 262 to the negative pole. It closes its contact 263 and thus energizes the rotary or motor magnet $DM_v$ of the selector finder whose brushes are now caused to travel until they find a trunk leading to an idle slow-acting finder or group selector. The relay 262 keeps the contacts 223, 226 open while the finder is hunting in order to prevent disturbances in busy lines whose contacts happen to be traversed by the brushes of the selector finder. As long as the brushes of the selector finder touch busy lines the locking circuit of the starting relay 262 extending through the contact 265 and the brush 206 is kept closed in the manner already described and this circuit is only opened when an idle trunk is found.

On the energization of the starting relay 262 a contact 265 is closed by which the restoring relay $rl$ of the quick-acting finder $F_1$ is energized in a circuit extending from earth through 265, 286, $rl$, to the negative pole. The relay $rl$ opens its contact 147 and thereby deënergizes the connecting relay $CR$ which receives current up to that moment by way of the contacts 146, 147 and the cut-off relay $co_{50}$ of the calling subscriber. The connecting relay opens its contacts 148, 149 while closing its contact 134. By the closure of the contact 134 the interrupter 133 is applied through 122 and 134 to the wire 138 which conducts the impulses produced by the interrupter 133 through the contacts 135 and 136 to the pairs of motor magnets $E_1$, $E_2$ and $E^1_1$, $E^2_1$. Of each of these pairs of magnets only the one ($E^2$ resp. $E^1_2$) that previously operated in setting the quick-acting finder onto the calling line will receive impulses, for when the primary and secondary switches are moved toward the bank contacts representing the calling line their switches $DS_1$, $DS_2$, which are constructed like the switch $ds$, Fig. 3, always close the contact $C$ that corresponds the active motor magnet. Therefore in the present case the contact $C_2$ that corresponds to the magnet $E_2$ and the contact $C^1_2$ corresponding to the magnet $E^1_2$ are closed and when the restoring circuits are closed current impulses will flow, firstly from the negative pole through 133, 122, 134, 138, 135, $E_2$, $C_2$, $DS_1$ to earth and secondly from the negative pole through 133, 122, 134, 138, 136, $E^1_2$, $C^1_2$, $DS_2$ to earth. In order to prevent these motor magnet circuits from being opened by the test relays $tp$, $sp$ during the trailing of the guide brushes $W_p$, $W_s$ over the contacts of earthed permutation wires, the circuits of these relays are kept open by the contact 141 of the restoring relay $rl$, until the quick-acting finder regains its normal position, in which the off-normal switch $OS_1$ opens its contacts 122 and 120 and thus stops the flowing of the impulses through the magnets $E_2$, $E^1_2$ and opens the locking circuit of the restoring relay $rl$. The quick-acting finder $F_1$ is now ready to connect another calling line to the idle group selector which by this time will have been found by the selector finder VS associated with the quick-acting finder.

As the selector finder VS has made a connection with a different group selector GW than the one used for the desired talking connection the circuit which extended from the negative battery pole through 219, 202, 208, $df$, $df_{59}$, $wd_5$, brush of brush set $W^1$, $d$ to the the negative pole is broken and the relay 220 closes its contact 216. But the circuit of the rotary magnet 214 of the slow-acting finder is kept open by the relay 239 which is energized in the same circuit as the cut-off relay $co_{59}$ and keeps its armature contact 215 open.

During the steady closure of the loop of the calling subscriber, which occurs after the final selector LW has been made to select the desired contact row, the side switch of the final selector is moved from its first into its second position by an impulse which flows from the negative battery pole through 266, 267, 290, 291, 292, 293, side switch magnet $SM_3$ to earth when the change over relay $CR_1$ lets its armature drop back.

The operation of the relay set $LR^1$, $RR_1$, $CR_1$ that governs the actions of the final selector corresponds to that of the set of controlling relays in the group selector so that a detailed description of this operation is unnecessary.

By the shifting of the contact arm 272 of the side switch into its second position the rotary magnet $DM_1$ is connected to the selecting or stepping circuit 270 of the final selector. Furthermore the negative pole of the battery is connected by the contact arm 294 to the lower winding of the line control relay $LR^1$ and this connection substitutes the connection to the limb $b_1$ of the talking circuit that was disconnected in the group selector from this limb by the disconnection of the relay 259. The substitutional connection with the negative pole through the contact arm 294 is made before the relay 259 in the group selector is disconnected from the limb $b_1$ by the shifting of the contact arm 251 from its third to its fourth position. This retarded disconnection of the relay 259 is caused by slow-acting relay $261^a$ letting its armature drop back slower than the relay $CR_1$. Since the circuit including the side switch magnet $SM_2$ and the contact 264 is opened later than the circuit of the side switch $SM_3$ is closed, the side switch magnet $SM_2$ causes the side switch of the group selector to move into its fourth position later than the side switch magnet $SM_3$ connects the negative battery pole through 294 and the lower winding of the line control relay $LR^1$ to the $b$-limb of the talking circuit. Thus, during this change of circuits no deënergization of the line control relay $LR^1$ takes place. It now receives current over the following path: negative pole of battery, lower winding of the line control relay $LR^1$, $bv$, $bg$, 248, $b_1$, 285, $bf$, $bf_{59}$, $b_{59}$, $S_{59}$, $a_{59}$, $af_{59}$, $af$, 283, $a_1$, 247, $ag$, $av$, upper winding of relay $LR^1$, earth.

The calling subscriber, who desires a connection with station No. 354, now sends in a series of four units selecting impulses which causes four oscillations of the armature of the line control relay $LR^1$. The relays $RR_1$, $CR_1$ are kept energized during these oscillations and each time the armature of $LR^1$ falls back a current impulse flows from the negative battery pole through 266, 269, 270, 271, 272, rotary magnet $DM_1$ to earth. The rotary magnet turns the brushes $a_s$, $b_s$, $c_s$ four steps placing them in contact with the fourth line in the fifth contact row of the selector i. e. in contact with the desired line No. 354. When the selecting impulses cease the calling subscriber's loop is again steadily closed and the change over relay $CR_1$ is caused to release its armature by its being short-circuited at 268. When the armature of the change over relay drops back it closes the change over circuit which extends from the negative pole through 266, 267, 290, 291, 292, 293, side switch magnets $SM_3$ to earth. The side switch of the final selector is now shifted into its third position and its contact arm 297 closes the circuit of the test relay 300 which extends from earth through 297, 300, $cs$, $cl_{54}$, $c_{54}$, cut-off relay $co_{54}$ of the wanted line to the negative pole. If the desired station is free the test potential on the test wire $cl_{54}$ will be high enough to cause the energization of the test relay 300. This relay then attracts its armature and closes the contacts 301, 302 The closure of the latter contact causes the ringing relay RL to be energized (negative pole, 302, 303, RL, earth). The relay RL closes its armature contacts 304, 305 thereby connecting the ringing current machine LM to the brushes $a_s$, $b_s$ whereupon a ringing current flows from the ringing machine through the ringing cut-off relay 307, 304, $a_s$, $al_{54}$, $a_{54}$, wanted station $S_{54}$, $b_{54}$, $bl_{54}$, $b_s$, 305, interrupter 306, back to ringing machine LM. The moment the called subscriber responds to the call by removing his receiver from its switchhook, the ringing current flowing through the relay 307 is strengthened sufficiently to cause this relay to close its armature contact 308 so as to energize the relay 309 (negative pole, 308, 309, earth). The relay 309 then closes its locking circuit, which extends from earth through 309, 310, 311 of the off-normal switch to the negative pole, and at the same time it opens at contact 303 the circuit of the ringing relay RL causing this relay to open its contacts 304, 305 while closing the contacts 312, 313. Since the contact arms 295, 296 are in their third positions the called subscriber now receives a current from the battery $B_2$ which flows through the lower winding of the relay $AR_1$, 296, 313, $b_s$, $bl_{54}$, $b_{54}$, $S_{54}$, $a_{54}$, $al_{54}$, $a_s$, 312, 295, upper winding of $AR_1$, back to the battery $B_2$. The relay $AR_1$ attracts its armature 314 which then brushes past the contact spring 315.

If the called subscriber is the first to replace his receiver on the switchhook the current flowing through $AR_1$ will cease whereupon the armature 314 falls back and brushes past the spring 315 pressing it against the spring 316. This causes a current impulse to flow from the negative pole through 316, 317, 318 of the off-normal switch, release magnet $AM_1$ of the final selector to earth, whereby the final selector is released. At the same time a circuit is closed from the negative pole through 315, 316, 317, $cv$, $cg$, 246, release relay 255 of the group selector to earth. The release relay 255 closes its contact 320 thus causing the release magnet AM of the group selector to be energized by a current flowing from earth through 320, 253, AM to the negative battery pole. This restores the group selector to its normal position and the moment the contact 250 of the side switch of the group selector severs the connection between the wire 321 and earth the locking circuit of the relay 280 and also the circuit of the relay 239 are interrupted. The relay 280 severs the connection between the brushes $af$, $bf$ and the wires $a_s$, $b_s$ and thus prevents disturbances being caused in busy talking circuits which may be momentarily touched by the brushes $af$, $bf$, while traveling back into their normal positions. The falling back of the armature of relay 239 causes the closure of contact 215 and therefore the closure of the circuit of the rotary magnet 214 which circuit extends from the earth through 216, 215, 214, 217, interrupter 218, to the negative battery pole. The rotary magnet 214 then rotates the brushes $af$, $bf$, $cf$, $df$ until they reach their normal position in which the off-normal switch $OS_2$ opens the contacts 233, 217. The opening of the contact 217 causes the circuit of the rotary magnet 214 to be broken and stops the motion of the set of brushes $af$, $bf$, $cf$, $df$.

When the final selector reaches its normal position and opens the contact 311 the relay 309 is deënergized by the opening of its locking circuit and all the apparatus is then restored to its normal position.

If the calling subscriber is the first to abandon the connection his replacing of the receiver will cause the steady closure of the contact 323 and the short-circuiting of the release relay $RR_1$. This relay then lets its armature drop back so as to close the contact 322. This connects the negative pole through 322 and 317 to the wire $c_v$ which energizes the release magnet $AM_1$ of the final selector and the release relay 255 of the group selector. The restoring operation is thus commenced and it progresses in the same way as it did when started by the called subscriber.

If the desired line is busy when the last change over impulse is sent and the side switch shifts into its third position the test relay 300 will not be energized and a tone giving device 325 will be connected to the line $a_v$ through 326, 325 and 324. The calling subscriber then receives a busy signal and replaces his receiver on the switch-hook thereby causing the restoration of all devices to their normal position in the manner already described.

Special attention will now be called to circuits for stopping the slow-acting finders on calling lines.

The circuits for this purpose contained in Figs. 5, 6, 7 and 8 are shown by themselves in Fig. 11 in order that their functions may be more easily explained. With the circuits arranged as shown in this figure it would be possible for two slow-acting finders to make connection with one and the same calling line. Assuming for example that the quick-acting finder $F^1_1$ is connected by its associated selector finder to the slow-acting finder $LF_3$, that the line $l_{60}$ calls and that the quick-acting finder $F^1_1$ makes connection with this line. The slow-acting finder $LF_3$ will now also make connection with the line $l_{60}$. Suppose now that while that connection desired by the calling line $l_{60}$ is being extended by the other selectors (group selectors, etc.) to the wanted line another subscribed $l_{61}$ calls and that this second call is taken by another quick-acting finder $F^1_2$ which is connected by its selector finder to the slow-acting finder $LF_1$. It could now happen that the slow-acting finder $LF_1$ reaches the contacts of line $l_{60}$ before the first quick-acting finder $F^1_1$ has been disconnected from this line. The relay 320 that opens the circuit of the rotary magnet $DM_7$ of the slow-acting finder would then be energized by a current through the wire of the line $l_{60}$ that is connected by $wd$, $W^1_1$ to the positive pole of the battery and consequently a second slow-acting finder $LF_1$ would be connected to the calling line in addition to the finder $LF_3$. The second calling line $l_{61}$ will not be properly connected.

In Fig. 12 circuits are shown by which the above described undesirable operations of the slow-acting finders are prevented. With these circuits the motor magnet ($DMa$, $DMb$) of the slow-acting finder ($LFa$, $LFb$) used for a connection is first caused by a starting impulse, in the manner described in connection with Figs. 5, 6, 7 and 8, to move the slow-acting finder out of its normal position and to be connected to an interrupter $218a$. This results in the closure of an off-normal contact $kz$, Fig. 12, which closes the circuit of a relay $320a$. This circuit extends from the brush of the selector finder (e. g $302b$) that just happens to be connected to the slow-acting finder LFa. The energization of the relay 320a will thus be caused in this case by a current that flows from the positive pole through a resistance Xa, 320a kz, 302b, resistance Yb to the negative pole of the battery. The relay 320a is now kept energized by this current until the brush of the slow-acting finder LFa strikes the line with which the quick-acting finder Fb established a connection when the relay 320a will be deenergized by being short-circuited and will open the circuit of the motor magnet DMa.

The relay 320a would not be short-circuited by the finder LFa striking lines that happen to be connected to other quick-acting finders e. g. Fa. In such cases a current impulse would flow from the positive pole through LFa, Fa, Ya to the negative pole. The current flowing through the resistance Xa would be strengthened by the current flowing through Ya and the current flowing through the relay 320a would be weakened. But the resistance of Ya is such that this diminution of current is not sufficient to deënergize the relay 320a. Thus the relay 320a is only deënergized when the slow-acting finder LFa reaches the line that the quick-acting finder Fa has connected to. It is only then that the relay 320a is completely short-circuited and stops the slow-acting finder by letting its armature drop back.

A defect in the circuits shown in Fig. 12 consists in the fact that the relay 320a on account of its being deënergized by its winding being short-circuited would be inclined to let its armature drop back slowly. This slowness in the opening of the circuit of the motor magnet DMa could result in a slow-acting finder passing the calling line that it should stop at.

In order to make the relay (320a, 320b) release its armature promptly it is preferably made as shown in Fig. 12$^a$ according to which it has two differential windings Xd, Xe. By the closure of the off-normal contact $k^1y$, due to the starting impulse, the relay is energized by a current flowing through Xc, Xd, Xe, vc, the magnetic influence of winding Xe being greater than that of Xd. Each time the slow-acting finder LFc strikes a line connected through a resistance ya to the negative pole the currrent in Xd is strengthended somewhat and the current in Xe weakened. But the magnetization by winding Xd only neutralizes the magnetization produced by Xe when the line is reached by LFc that is connected through yc to the negative battery pole. The weakening of the current in Xe and the simultaneous strengthening of the current Xd will then cause a complete neutralization of the magnetizing effects of both windings and the armature of the relay (Xd, Xe) will be promptly released.

The system described in this specification may be used for semi-automatic working by inserting an operator's equipment between each quick-acting finder and the selector finder associated therewith.

I claim:

1. A system for interconnecting calling and wanted telephone lines by electromechanically controlled switches comprising a group of comparatively quick-acting switches, a group of comparatively slow-acting switches, a group of selecting switches for selecting desired lines, and means for connecting any quick-acting switch directly to any selecting switch.

2. A system for interconnecting calling and wanted telephone lines comprising a group of switches containing a plurality of quick-acting switches, a plurality of slow-acting switches, a plurality of selecting switches for selecting wanted lines, means for connecting a calling line to a selecting switch through a quick-acting switch, and means for subsequently connecting the said calling line to a selecting switch through a slow-acting switch and for dissolving the connection through the said quick-acting switch.

3. A system for interconnecting calling and wanted telephone lines by electromechanically controlled switches comprising a group of quick-acting line finders, a group of comparatively slow-acting line finders, a group of selecting switches for selecting desired lines and means for connecting any quick-acting switch directly to any selecting switch.

4. A system for interconnecting calling and wanted telephone lines comprising a group of switches containing a plurality of quick-acting line finders, a plurality of slower-acting line finders, a plurality of selecting switches for selecting wanted lines, means for connecting a calling line to a selecting switch through a quick-acting line finder, and means for subsequently connecting the said calling line to a selecting switch through a slow-acting finder and for dissolving the connection through the said quick-acting finder.

5. A system for interconnecting calling and wanted telephone lines by electromechanically controlled switches comprising a group of quick-acting switches having fixed and movable contacts, a group of slow-acting switches having fixed and movable contacts, a group of selecting switches for selecting desired lines and subscriber's line connected to fixed contacts in each switch of each said group of switches.

6. A system for interconnecting calling and wanted telephone lines by electromechanically controlled switches comprising a group of comparatively quick-acting switches, a group of comparatively slow-acting switches, a group of selecting switches for selecting desired lines and a selector finder associated with each quick-acting switch for connecting the quick-acting switch to an idle selecting switch.

7. A system for interconnecting calling and wanted telephone lines by electromechanically controlled switches comprising a group of quick-acting line finders, a group of comparatively slow-acting line finders, a group of selecting switches for selecting desired lines and a selector finder associated with each quick-acting line finder for connecting it to an idle selecting switch.

8. In a system for interconnecting calling and wanted telephone lines, groups of subscribers' lines each group having a plurality of quick-acting switches, a plurality of comparatively slow-acting switches, a plurality of group selectors, a plurality of final selectors for selecting a desired line and a group selector finder associated with each quick-acting switch for connecting it to an idle group selector.

9. In a system for interconnecting called and wanted telephone lines, groups of subscribers' lines, each group having a plurality of quick-acting switches, a plurality of slower-acting switches, a plurality of group selectors, a plurality of final selectors, means for connecting a calling line to a group selector through a quick-acting switch and means for subsequently connecting the said calling line to the said group selector through a slow-acting switch and for dissolving the connection through the said quick-acting switch.

10. A system for interconnecting calling and wanted telephone lines by electromechanically controlled switches comprising a group of comparatively quick-acting switches, a group of comparatively slow-acting switches, a group of selecting switches for selecting desired lines, means for extending a connection from a calling line toward a wanted line through a quick-acting switch and a selecting switch, means for dissolving the connection through the quick-acting switch after the connection has advanced to a certain stage and a selector finder for thereupon connecting the quick-acting switch to an idle selecting switch.

11. A system for interconnecting calling and wanted telephone lines by electromechanically controlled switches comprising a group of comparatively quick-acting line finders, a group of comparatively slow-acting line finders, a group of selecting switches for selecting desired lines, means for extending a connection from a calling line toward a wanted line through a quick-acting line finder and a selecting switch, means for dissolving the connection through the quick-acting line finder after the connection has advanced to a certain stage and a selector finder for thereupon connecting the quick-acting line finder to an idle selecting switch.

12. A system for interconnecting calling and wanted telephone lines by electromechanically controlled switches comprising a group of comparatively quick-acting switches, a group of comparatively slow-acting switches, a group of selecting switches, means for causing each selecting switch to select a line, change-over means for causing each selecting switch to change from a selecting operation to another operation, means for extending a connection from a calling line toward a wanted line through a quick-acting switch and a selecting switch, and dissolving means for dissolving the connection through the quick-acting switch, said dissolving means operating upon the operation of the said change-over means.

13. A system for interconnecting calling and wanted telephone lines by electro-mechanically controlled switches comprising a group of comparatively slow-acting switches, magnets for operating the quick-acting switches, magnets for operating the slow-acting switches, a group of selecting switches for selecting desired lines, subscribers connected to the quick-acting switches and slow-acting switches, calling means controlled by the subscribers and means for starting the operation of the operating magnet of a quick-acting switch and of a slow-acting switch immediately a subscriber calls.

14. A system for interconnecting calling and wanted telephone lines by electromechanically controlled switches comprising a group of primary line-finders with a number of movable line hunting contacts, a group of secondary line-finders with a smaller number of line hunting contacts, a group of selecting switches for selecting desired lines and means for connecting any primary line finder to an idle selecting switch.

15. A system for interconnecting calling and wanted telephone lines by electromechanically controlled switches comprising a group of comparatively quick-acting switches, a group of comparatively slow-acting switches, a group of selecting switches for selecting desired lines, means for connecting any quick-acting switch to an idle selecting switch, disconnecting means for disconnecting a quick-acting switch from a selecting switch and an electromagnet associated with each selecting switch for controlling the said disconnecting means.

16. A system for interconnecting calling and wanted telephone lines by electromechanically controlled switches comprising a source of current, groups of switches each having a set of quick-acting line finders, a set of slow-acting line finders, a set of group selectors and a set of final selectors, selecting circuits for causing the group selectors and final selectors to select desired lines, means for connecting a quick-acting finder to an idle group selector, disconnecting means for disconnecting a quick-acting finder from a group selector and an electromagnet associated with the group selector for actuating the said disconnecting means, said electromagnet being energized by a current in a selecting circuit.

17. A system for interconnecting calling and wanted telephone lines by electromechanically controlled switches comprising a group of comparatively quick-acting switches, a line relay normally connected to each telephone line for indicating the line to a quick-acting switch, a group of slow-acting switches, a group of selecting switches for selecting desired lines, a cut-off relay for each telephone line for disconnecting the line from its line relay, current paths through the quick-acting switches for energizing the said cut-off relays and current paths through the slow-acting switches for energizing the said cut-off relays.

18. A system for interconnecting calling and wanted telephone lines by electromechanically controlled switches comprising a group of comparatively quick-acting line finders, a line relay normally connected to each telephone line for indicating the line to a quick-acting line finder, a group of slow-acting line finders, a group of selecting switches for selecting desired lines, a cut-off relay for each telephone line for disconnecting the line from its line relay, circuits for energizing the said cut-off relays, a said circuit being first closed by a quick-acting line finder and subsequently by a slow-acting line finder.

19. In a system for interconnecting calling and wanted telephone lines by electromechanically controlled switches, a group of telephone lines, a group of primary line finders each having fixed and movable contacts, indicating means for indicating a calling line to a primary line finder, means for connecting the movable contacts of any one primary line finder to an indicated calling line, a group of secondary line finders each having fixed and movable contacts, means for associating an idle secondary line finder with the said primary line finder, and distinguishing means for enabling the secondary line finder to distinguish the calling line to which the movable contacts of the associated primary line finder is connected from all the other telephone lines.

20. In a system for interconnecting calling and wanted telephone lines by electromechanically controlled switches, a group of telephone lines, a group of primary line finders each having fixed and movable contacts, indicating means for indicating a calling line to a primary line finder, means for connecting the movable contacts of any primary line finder to an indicated calling line, a group of secondary line finders each having fixed and movable contacts, means for associating an idle secondary line finder with the said primary line finder, a motor magnet for moving the movable contacts of the said secondary finder, a distinguishing circuit for enabling the secondary line finder to distinguish the calling line to which the movable contacts of the associated primary line finder is connected from all the other telephone lines and for stopping the operation of the motor magnet of the secondary line finder, means for disassociating the primary line finder from the secondary line finder and a circuit associated with the secondary line finder for preventing a renewed operation of the motor magnet of the secondary line finder.

21. A system for interconnecting calling and wanted telephone lines by electromechanically controlled switches comprising a group of comparatively quick-acting switches, a group of slow-acting switches, a group of selectors for selecting desired lines, selector finders connected to the quick-acting switches and for finding idle selectors, electromagnets for putting a selector finder into connection with an idle selector and means associated with the said selector for starting the operation of the said electromagnets.

22. A system for interconnecting calling and wanted telephone lines by electromechanically controlled switches comprising a group of comparatively quick-acting switches, a group of slow-acting switches, a group of selectors, selecting means in the selectors for selecting wanted lines, change-over means in the selectors for changing over from a selecting operation to another operation, selector finders connected to the quick-acting switches and for finding idle selectors, electromagnets for putting a selector finder into connection with an idle selector and means associated with the said selector for starting the operation of the said electromagnets at the moment a change over means operates.

23. A system for interconnecting calling and wanted telephone lines by electromechanically controlled switches comprising a group of selectors for selecting wanted lines, releasing means for releasing said selectors, means for operating the releasing means, a group of quick-acting switches for connecting a calling line to a selector, a group of slow-acting switches for connecting a calling line to a selector, selector finders connected to the quick-acting finders and for finding idle selectors, electromagnets for putting a selector finder into connection with an idle selector and starting means for starting the operation of the said electromagnets, said starting means being operated at the same time as the releasing means of a selector.

24. A system for interconnecting calling and wanted telephone lines by electromechanically controlled switches comprising a group of selectors for selecting wanted lines, a group of quick-acting switches, a group of slow-acting switches with connecting contacts for connecting to calling lines, means for associating a quick-acting switch with a selector and a slow-acting switch, normally open contacts for disconnecting the connecting contacts of a slow-acting switch from the selector associated therewith, disassociating means for disassociating a quick-acting switch from a selector and means for closing the said normally open contacts upon the operation of the said disassociating means.

25. A system for interconnecting calling and wanted telephone lines by electromechanically controlled switches comprising a group of selectors, selecting means in each selector for selecting wanted lines, change over means in each selector for changing over from the selecting operation to another operation, a group of quick-acting switches, a group of slow-acting switches with connecting contacts for connecting to calling lines, means for associating a quick-acting switch with a selector and a slow-acting switch, normally open contacts for disconnecting the connecting contacts of a slow-acting switch from the selector associated therewith and means for closing the said normally open contact when a said change over means operates.

26. Telephone lines, non-numerical calling-line-connecting switches, numerical called-line-connecting switches, link circuits extending between the calling-line-connecting switches and the called-line connecting-switches, transitorily-used switches which are only used temporarily during the establishing of a connection and non-numerical means by which a calling subscriber is connected first by a transitorily-used switch and then by a said calling-line-connecting switch to one and the same called-line-connecting switch without the aid of manually-operated switch controllers.

27. Telephone lines, non-numerical calling-line-connecting-switches having fixed contacts connected to the telephone lines, numerical called-line-connecting-switches having fixed contacts connected to the telephone lines, link circuits extending between the calling-line-switches and the called-line switches and transitorily used switches for connecting a calling line to a link circuit, said transitorily used switches having fixed contacts connected to the telephone lines.

28. Telephone lines, non-numerical calling-line-connecting-switches, group selectors, wanted line selectors, link circuits extending between the calling-line-connecting-switches and the group selectors, transitorily-used calling-line-connecting-switches, means for associating a transitorily-used calling-line-connecting-switch with a group selector, means for extending a calling line through a transitorily-used switch to the group selector with which it is associated and means by which a non-numerical calling-line-connecting-switch also connects the associated group selector to the said calling line.

29. Subscribers lines, non-numerical calling-line-connecting-switches, called-line-connecting-switches, link circuits between the non-numerical calling-line-connecting-switches and the called line connecting switches, transitorily-used line connecting switches which are only used temporarily in establishing a connection, manually operated switch controllers for controlling the called-line-connecting-switches, means for connecting a subscriber's line through a transitorily-used switch to a called-line connecting switch and means for connecting the subscriber's line also through a non-numerical switch to the said called-line-connecting-switch independently of the said manually operated switch controllers.

In witness whereof I have signed this specification in the presence of two witnesses.

FRITZ ALDENDORFF.

Witnesses:
HENRY HASPER,
WOLDEMAR HAUPT.